(12) United States Patent
Sajjad Jamali et al.

(10) Patent No.: US 10,413,951 B2
(45) Date of Patent: Sep. 17, 2019

(54) HYDROSTATIC EXTRUSION SYSTEM AND METHOD FOR PRODUCING HIGH STRENGTH SEAMLESS PIPES

(71) Applicants: Seyed Sajjad Jamali, Tehran (IR); Karen Abrinia, Tehran (IR); Ghader Faraji, Tehran (IR)

(72) Inventors: Seyed Sajjad Jamali, Tehran (IR); Karen Abrinia, Tehran (IR); Ghader Faraji, Tehran (IR)

(*) Notice: Subject to any disclaimer, the term of this patent is extended or adjusted under 35 U.S.C. 154(b) by 546 days.

(21) Appl. No.: 15/265,159

(22) Filed: Sep. 14, 2016

(65) Prior Publication Data

US 2017/0001228 A1 Jan. 5, 2017

(30) Foreign Application Priority Data

Sep. 14, 2015 (IR) .................. 139450140003006793

(51) Int. Cl.
| | |
|---|---|
| B21C 31/00 | (2006.01) |
| B21C 23/00 | (2006.01) |
| B21C 23/08 | (2006.01) |
| B21B 47/00 | (2006.01) |
| F16F 1/06 | (2006.01) |

(52) U.S. Cl.
CPC ............ B21C 23/007 (2013.01); B21B 47/00 (2013.01); B21C 23/00 (2013.01); B21C 23/085 (2013.01); F16F 1/06 (2013.01)

(58) Field of Classification Search
CPC ..... B21C 23/007; B21C 23/085; B21C 23/00; B21B 47/00; F16F 1/06

USPC .............. 72/60, 202; 128/177; 267/166
See application file for complete search history.

(56) References Cited

U.S. PATENT DOCUMENTS

| | | | | |
|---|---|---|---|---|
| 3,751,958 A | * | 8/1973 | Nilsson ................. | B21C 23/007 72/264 |
| 3,795,970 A | * | 3/1974 | Keathley ............... | B21C 23/007 148/519 |
| 3,841,128 A | * | 10/1974 | Nilsson ................. | B21C 23/007 72/265 |

(Continued)

FOREIGN PATENT DOCUMENTS

| | | |
|---|---|---|
| CN | 105537308 A | 5/2016 |
| DE | 102016101989 A1 | 6/2016 |

*Primary Examiner* — David B Jones
(74) *Attorney, Agent, or Firm* — NovoTechIP International PLLC

(57) ABSTRACT

A system and method for producing a seamless pipe from a hollow billet with a smaller diameter than the seamless pipe, uses a pressure container configured to house the hollow billet. The hollow billet is surrounded by a fluid. A movable punch arranged to fit inside the hollow billet, wherein a hydraulic pressure is transferred from the fluid to the movable punch and to the hollow billet simultaneously, along at least a partial length of the hollow billet. A die opening is arranged serial to the pressure container, wherein the die opening is configured to house a fixed mandrel, the fixed mandrel having a diameter larger than an inner diameter of the hollow billet, so that a gap is formed between the die opening and the fixed mandrel, and the hydraulic pressure of the fluid is generated by an input force from an input punch to move the hollow billet towards the die opening and force the hollow billet material into the gap between the die opening and the fixed mandrel.

20 Claims, 10 Drawing Sheets

(56) References Cited

U.S. PATENT DOCUMENTS

| | | | | | |
|---|---|---|---|---|---|
| 4,083,214 | A | * | 4/1978 | Asari | B21C 23/007 |
| | | | | | 72/60 |
| 4,138,871 | A | * | 2/1979 | Kawano | B21C 23/007 |
| | | | | | 72/269 |
| 5,893,287 | A | | 4/1999 | Lyahovetsky et al. | |
| 6,125,679 | A | * | 10/2000 | Saluja | B21C 23/005 |
| | | | | | 70/260 |
| 2010/0037976 | A1 | | 2/2010 | Toyotake et al. | |

* cited by examiner

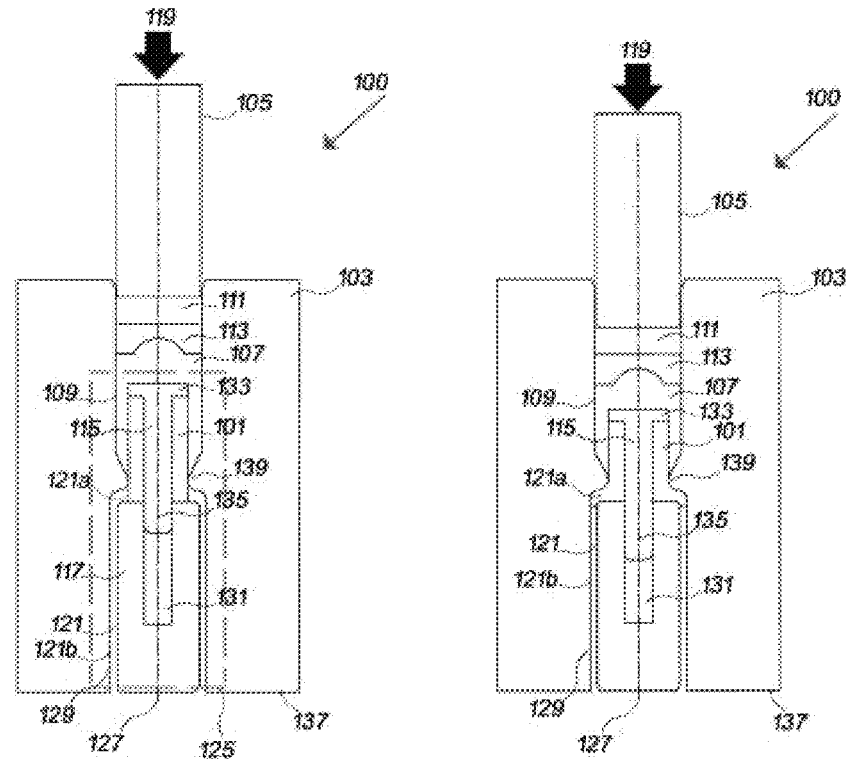
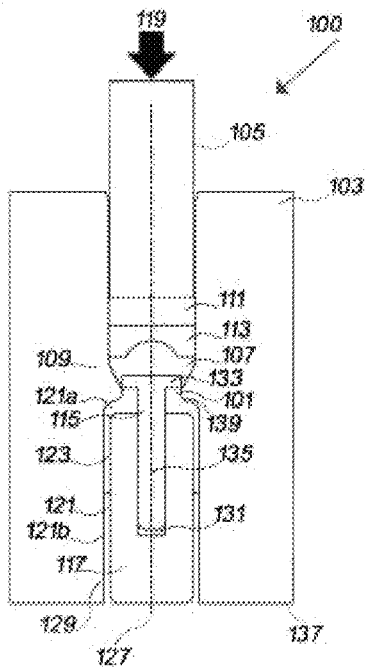
FIG. 1A  FIG. 1B  FIG. 1C

HYDROSTATIC EXTRUSION SYSTEM AND METHOD FOR PRODUCING HIGH STRENGTH SEAMLESS PIPES

CROSS REFERENCE TO RELATED APPLICATION

This application claims the benefit of priority to an Iran patent application having serial number 139450140003006793 filed on Sep. 14, 2015, which subsequently issued as Iran patent number 89567 on Aug. 14, 2016 both of which are incorporated by reference herein in their entireties.

TECHNICAL FIELD

The instant application relates generally to production of seamless high strength pipes with large diameters and, more particularly, to a hydrostatic extrusion system and method for production of high strength seamless pipes.

BACKGROUND

Various industries desire light-weight high strength parts to reduce energy consumption in moving devices by reducing their weights. Non-ferrous metals such as, for example, Aluminum and Magnesium, due to having low density and light weight are used in many different industries for producing various parts such as pipes. However, such non-ferrous metals lack strength in comparison with heavier metals such as steel, which can cause limitations in their use.

Currently, various technologies exist for producing seamless steel pipes that are used by different industries. However, mechanical and metallurgical properties of non-ferrous metals may not allow the technologies developed for steel pipes to be applied to such non-ferrous pipes.

Extrusion is a known forming method for producing seamless pipes from non-ferrous alloys such as Aluminum, Magnesium, Copper, Zinc, Plastic, etc. However, extrusion processes for producing seamless non-ferrous pipes, and especially those with so-called large diameters (e.g., over 10 inches in some cases), typically require a high amount of force for pushing a hollow billet through a die. This high amount of required force causes the need for costly technologies and equipment for the extrusion process.

Therefore, a need exists for a system and method for producing seamless high strength non-ferrous pipes with large diameters such that the amount of force required for the production process is reduced.

SUMMARY

In one general aspect, the instant application describes a system for producing a large diameter seamless pipe from a small diameter hollow billet. The system includes a pressure container configured to house the hollow billet, wherein the hollow billet is surrounded by a fluid in the pressure container; a movable punch arranged to fit inside the hollow billet, wherein a hydraulic pressure is transferred from the fluid to the movable punch and to the hollow billet, simultaneously, along at least a partial length of the hollow billet; a fixed mandrel having a diameter larger than an inner diameter of the hollow billet; a die opening arranged serial to the pressure container, wherein the die opening is configured to house the fixed mandrel, and wherein a gap is formed between the die opening and the fixed mandrel; and an input punch, wherein the hydraulic pressure to the fluid is generated by an input force from the input punch to move the hollow billet towards the die opening and force the hollow billet material into the gap between the die opening and the fixed mandrel.

The above-mentioned and other general aspects may include one or more of the following features. For example, the gap between the die opening and the fixed mandrel includes a radial gap and a forward gap, and wherein the hollow billet is forced into the gap to receive a radial forward extrusion by first extruding radially in the radial gap and then extruding forward in the forward gap to form a pipe, wherein an inner diameter of the pipe is equivalent of a diameter of the fixed mandrel and a thickness of the pipe is equivalent of a thickness of the gap. One or more microstructural changes during the radial forward extrusion cause a micro-hardness of material in the pipe to be higher than a micro-hardness of a material of the hollow billet. The radial forward extrusion can be performed at room temperatures without addition of heat by heating equipment. Alternatively, the radial forward extrusion can be performed with addition of heat by heating equipment. The hollow billet material forced into the gap between the die opening and the fixed mandrel can form the seamless pipe having high strength. The movable punch may fit inside the hollow billet and move together with the hollow billet towards the die opening due to the hydraulic pressure, and the fixed mandrel may include a hollow chamber to receive the movable punch.

The movable punch may have a T shape cross section, such that a top part of the movable punch has a diameter equivalent to an outer diameter of the hollow billet, and a bottom part of the movable punch has a diameter equal to an inner diameter of the hollow billet.

The system may further include a seal pad provided between the input punch and the pressure container configured to prevent leakage of the fluid from the pressure container, wherein the seal pad includes a first part and a second part of sealing material, and wherein the first part is located between the input punch and the second part is located between the first part and the pressure container, and wherein the second partpart has a diameter larger than the first part. The hollow billet may be a non-ferrous billet.

In another general aspect, the instant application describes a method for producing a large diameter seamless pipe from a small diameter hollow billet. The method includes placing a hollow billet inside a pressure container, wherein the hollow billet is surrounded by a fluid within the pressure container; arranging a movable punch inside the hollow billet, wherein a hydraulic pressure is transferred from the fluid to the movable punch and to the hollow billet simultaneously, along at least a partial length of the hollow billet; arranging a fixed mandrel inside a die opening located serial to the pressure container, the fixed mandrel having a diameter larger than an inner diameter of the hollow billet, wherein a gap is formed between the die opening and the fixed mandrel; and applying the hydraulic pressure to the fluid via an input force from an input punch to move the hollow billet towards the die opening and force the hollow billet material into the gap between the die opening and the fixed mandrel.

The above-general aspect may include one or more of the following features. For example, gap between the die opening and the fixed mandrel includes a radial gap and a forward gap, and wherein the hollow billet material forced into the gap receives a radial forward extrusion by first extruding radially in the radial gap and then extruding forward in the forward gap to form a pipe, wherein an inner diameter of the pipe is equivalent of a diameter of the fixed mandrel and a thickness of the pipe is equivalent of a thickness of the gap. The pressure container, the hollow billet, the movable punch and the fixed mandrel can be enclosed within an outer die and the outer die can be set up i) horizontally or ii) vertically.

The radial forward extrusion can be performed, if desired at typical ambient manufacturing room temperature, without needing additional heat, or with additional heat, in various implementations. The movable punch may fit inside the hollow billet and moves together with the hollow billet towards the die opening due to the hydraulic pressure, and wherein the fixed mandrel includes a hollow chamber to receive the movable punch.

The movable punch may have a T shape cross section, such that a top part of the movable punch has a diameter equivalent to an outer diameter of the hollow billet, and a bottom part of the movable punch has a diameter equal to or smaller than an inner diameter of the hollow chamber inside the fixed mandrel. The movable punch may have a cylindrical shape having a diameter equivalent to an inner diameter of the hollow billet.

In yet another general aspect, the instant application describes a system for producing a seamless pipe from a hollow billet. The system includes, a pressure container configured to house the hollow billet, wherein the hollow billet is surrounded by a fluid in the pressure container; a movable punch arranged to fit inside the hollow billet, wherein a hydraulic pressure is transferred from the fluid to the movable punch and to the hollow billet simultaneously, along at least a partial length of the hollow billet; a fixed mandrel having a diameter larger than an inner diameter of the hollow billet; and a die opening arranged serial to the pressure container, wherein the die opening is configured to house the fixed mandrel, and wherein a gap is formed between the die opening and the fixed mandrel, wherein the hydraulic pressure to the fluid is generated by an input force from a pump to move the hollow billet towards the die opening and force the hollow billet material into the gap between the die opening and the fixed mandrel. The hollow billet material forced into the gap between the die opening and the fixed mandrel can form the seamless pipe having high strength.

BRIEF DESCRIPTION OF THE DRAWINGS

Features of the subject technology are set forth in the appended claims. However, for purpose of explanation, several implementations of the subject technology are set forth in the following figures.

FIGS. 1A-1C illustrate diagrams of a hydrostatic extrusion system, according to one implementation;

DETAILED DESCRIPTION

Figure 2:
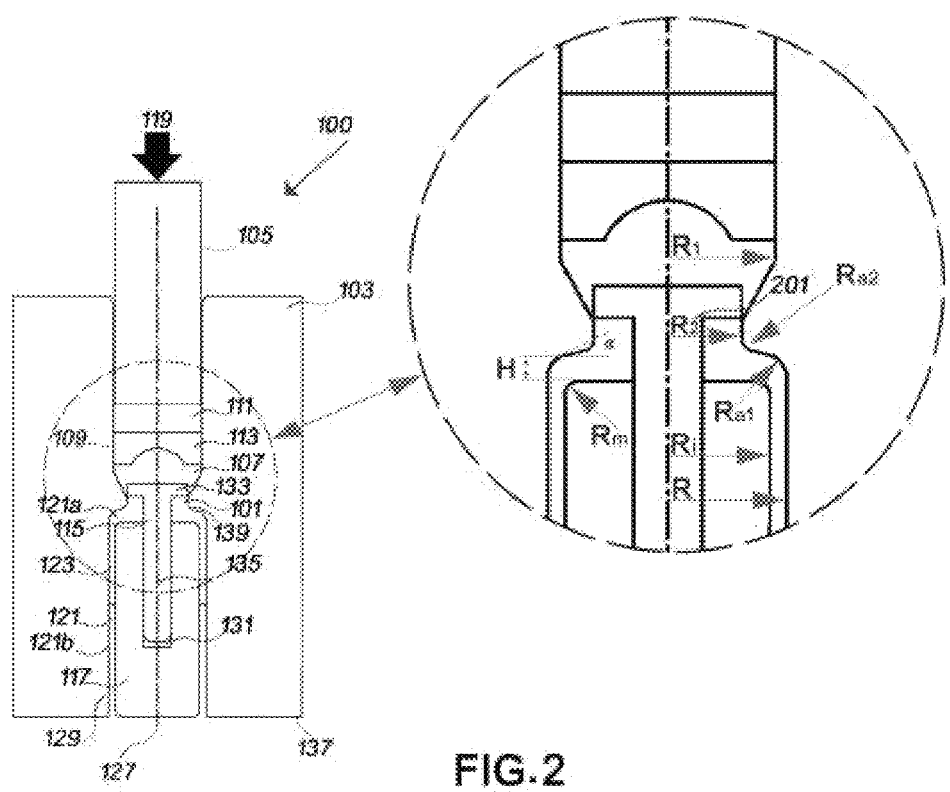
FIG. 2 illustrates geometrical parameters for the hydrostatic extrusion system, according to an implementation.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

Extrusion is a forming process for producing non-ferrous seamless pipes such as, for example, Aluminum, Magnesium, Copper, Zinc, Plastic, etc. In some known basic extrusion methods, a pipe is formed from a hollow billet with a diameter larger or equivalent to the finally formed pipe. Such typical extrusion is performed using a heated hollow billet and a die with one or more portholes; wherein the billet is pushed into the die such that the desired product is formed when the billet passes through the portholes. This process requires a high amount of force for extruding the billet through the die. Variations of extrusion such as, for example, direct extrusion, reverse extrusion, combined extrusion, etc., have been developed to reduce the amount of force required for the extrusion process. However, when the diameter of the pipe increases, the required force for forming the pipe increases which in return causes the need for high cost and complex machinery. For example, with the existing extrusion methods, the required force for forming a so-called large diameter pipe (e.g., with 10 to 12 inches diameter or more) may be several thousand tons and in addition complex and costly equipment may be needed for the process. Implementations described herein may in some cases ameliorate or overcome the difficulties described in this paragraph.

For example, in one implementation, a hydrostatic extrusion method for forming high strength seamless pipes with large diameters using direct radial extrusion is provided. The implementations herein may be used not only for so-called high strength pipes, and/or for so-called large diameter pipes, but also for pipes of any strengths and sizes. In hydrostatic extrusion according to some implementations described herein, a hydrostatic fluid is used for reduction of friction during extrusion process and the required force for the extrusion process in some implementations, as described herein, are reduced compared to the existing methods, such that an increase in the diameter of the formed pipe may not have an effect on the required hydraulic pressure for extrusion process.

In some implementations, a combined extrusion method is used in which a force provided by the hydrostatic fluid and use of a movable punch enables forming of seamless pipes with large diameters from hollow billets with diameters smaller than the formed seamless pipes, with low required hydraulic pressure. The use of hydrostatic fluid for force transfer and a movable punch can reduce the amount of hydraulic pressure required to achieve a higher diameter of the pipe on the amount of required hydraulic pressure for a given diameter compared to prior approaches. In fact, an increase in pipe diameter can cause reduction of the hydrostatic force. In general, the disadvantage of known methods, when attempting an increase in diameter of the seamless pipe is the significant increase in required force. However, implementations of the present method and system, may in some cases achieve a reduction of hydrostatic force compared to prior methods. In additions, due to the application of high strains in some implementations of the present method and system, the pipes produced via the present method and system can have improved metallurgical and mechanical properties. Moreover, the equipment used in the present method can in some implementations be simple equipment easily industrialized, and there may in some cases be no need for secondary processes for improving mechanical properties of the produced pipes.

The required force for the extrusion process of forming seamless pipes with large diameters (e.g., diameters larger than a diameter of an initial billet used) can be divided into several portions. A high portion of the force is associated with friction. Another portion includes the force needed to form the pipe at a deformation zone. This is because in pipes with large diameters the volume of the deforming material is high and the amount of deformation force is high which affect the extrusion process.

Therefore, a resulting aspect of some implementations described herein is a reduction in the required extrusion force compared to prior methods, for example, by reducing the friction, increasing the effective area on which the extrusion pressure is applied, etc. The instant system and method provide a hydrostatic radial forward extrusion for formation of seamless pipes with large diameters from an initial hollow billet having a diameter smaller than the produced pipe. In addition, the extrusion process performed by the provided system based on the provided method enhances mechanical and metallurgical properties of the material used in forming the seamless pipe.

FIGS. 1A-1C illustrate diagrams of the hydrostatic extrusion system, according to one implementation. The provided hydrostatic extrusion process is a combination of radial and forward extrusion including hydrostatics benefits in which, in some implementations, there is almost no contact friction between the hollow billet and the die used for the process. As shown in FIG. 1A, a hollow billet 101 has a smaller diameter and a larger thickness compared to the final produced seamless pipe (123 in FIG. 1C).

In one implementation, the hollow billet 101 is placed inside an outer die 103 such that the hollow billet 101 is constrained between a fixed mandrel 117 and a movable punch 115. A hydraulic fluid 107 fills the space between the hollow billet 101 and a pressure container 109 within the outer die 103. The hydraulic fluid 107 can eliminate friction force between the hollow billet 101 and the pressure container 109, when the hollow billet 101 is forced down by an input cylindrical input punch 105 (e.g. pressed down by a hydraulic press 119) applied from above. The reduction of friction force can reduce the total force required for the hydrostatic radial forward extrusion process. The movable punch 115 can simultaneously move with the hollow billet 101 during the hydrostatic radial forward extrusion process.

As shown in FIG. 1B, the hollow billet 101 can be extruded into the annular gap 121 formed between the fixed mandrel 117 and the outer die 103 until the hollow billet 101 stretches and forms into a seamless pipe 123 such that the diameter of the seamless pipe 123 reaches the desired final diameter of the fixed mandrel 117. As shown, the material that the hollow billet 101 is made from (e.g., Aluminum, Magnesium, Copper, Zinc, etc.) is first extruded into an annular 90° gap 121 and then forward down along gap 121 until the hollow billet 101 is formed into a seamless pipe 123 around the fixed mandrel 117. Simultaneous use of the movable punch 115 inside the hollow billet 101 and use of the hydraulic fluid 107 increase the effective area, and consequently a significant reduction in the required hydrostatic pressure can be achieved. According to Pascal principle, the pressure is inversely proportional to the square of the punch diameter.

The required hydrostatic pressure for the hydrostatic radial forward extrusion process of FIGS. 1A-1C is either constant or is reduced as the pipe diameter increases. In typical extrusion processes, an increase in the diameter of the initial billet can increase the force requirement for the extrusion and can cause a limitation in the production of seamless pipes with large diameters. However, in the instant hydrostatic radial forward extrusion system and method, production of large diameter seamless pipes is provided because the hydrostatic radial forward extrusion process can be performed at low hydrostatic pressures. The hydrostatic pressure produced within the fluid filled area 107 of the pressure container 109 provides pressure required for formation of a seamless pipe 123 from a hollow billet 101.

In some exemplary implementations, a commercially pure Aluminum (for example Aluminum with a purity of 99.5%) can be employed in the hydrostatic radial forward extrusion process. The hollow billet 101 can have a thickness of 22 millimeters (mm) in outer diameter, 4 mm in body thickness, and 35 mm in length. For example, the hollow billet 101 can be machined from an aluminum rolled plate and then annealed at 400° C. for 2 hours. The hydrostatic radial forward extrusion system 100 of each of FIGS. 1A-1C including the outer die 103, pressure container 109, input punch 105, fixed mandrel 117, movable punch 115, and other components can be manufactured from tool steel and hardened to approximately ~55 HRC. In addition, a lubricant such as MoS2 spray lubricant can be used on the components of the surfaces of the hydrostatic radial forward extrusion system 100 in the deformation zone 125 to reduce the friction in the particular contact area.

The components of the hydrostatic radial forward extrusion system 100, including the outer die 103 which holds other components such as the movable punch 101, the fixed mandrel 117 and the hollow billet 101 can be installed either horizontally or vertically. When the outer die 103 is installed vertically, the outer die 103 and the fixed mandrel 117 can be installed on a platform, such that the bottom 137 of outer die 103 is closed during the hydrostatic radial forward extrusion process. Upon completion of the hydrostatic radial forward extrusion process, the bottom 137 can be opened and the fixed mandrel 117 and the formed seamless pipe 123 can be removed. Alternatively, when the outer die 103 is installed horizontally, the outer die 103 can be fixed to the ground using a foundation. The length of the outer die 103 can be shorter when installed horizontally and only cover the hollow billet 101, while the fixed mandrel 117 and the formed seamless pipe 123 can be uncovered and stand out from the outer die 103. The horizontal model may be more suitable for producing longer seamless pipes 123 compared to the vertical outer die 103.

The opening of outer die 103 (the pressure container 109), where the hollow billet 101 is placed, can have a diameter larger than the diameter of the hollow billet 101. The pressure container 109 is filled with a fluid 107. The lower part of the pressure container 109 can be narrowed (shown as 139 in FIGS. 1A-1C) to have the same diameter as the hollow billet 101. The narrowed part 139 of the pressure container 109 can provide sealing for fluid 107 and prevents reduction of the fluid pressure. It can also prevent leakage of fluid 107 into the gap 121.

The fixed mandrel 117 may have a cylinder shape. The fixed mandrel can be fixed during the hydrostatic radial forward extrusion process and can be dismantled upon completion of the process such that the formed seamless pipe 123 can be removed. The fixed mandrel 117 can have a hollow chamber 131 such that the movable punch 115 can enter and fit into the hollow chamber 131 during the hydrostatic radial forward extrusion process. The movable punch 115 can have a diameter equivalent to the inner diameter of the hollow billet 101. The movable punch 115 can fit inside the hollow billet 101 and move with the hollow billet 101 during the hydrostatic radial forward extrusion process.

In some implementations, the hydrostatic radial forward extrusion process can be performed at room temperature (e.g., cold process) without a need for heating the hollow billet 101 during the hydrostatic radial forward extrusion process. Such non-heat instances of the hydrostatic radial forward extrusion process can be used when the hollow billet 101 is made from non-heat treatable material. In some other instances, the hydrostatic radial forward extrusion process can be performed with elevated temperature (e.g., when the hollow billet 101 is heat treatable), for example, by heating the hollow billet 101 during the hydrostatic radial forward extrusion process, such that the required force for the process is further reduced.

The movable punch 115 may have a T shape of which a bottom part 135 fits inside the hollow billet 101. In some instances, the movable punch 115 may have a cylindrical shape without the top part 133. In such instances, the movable punch 115 can be fixed to the hollow billet 101 by other means such as, for example, by a spring to prevent the movable punch 115 from sliding inside the hollow billet 101. Alternatively, the cylindrical movable punch 115 can be fixed to the hollow billet 101 based on the close tolerance machining such that the cylindrical movable punch 115 is tightly fit into the hollow billet 101 during the hydrostatic radial forward extrusion process.

The hydrostatic pressure required for the hydrostatic radial forward extrusion process can be provided by a press 119. The pressure can be transferred to the fluid 107 via an input punch 105. In addition, seal pads 111, and 113 can be used for sealing the pressure container 109. The seal material 113 can have a curved surface such that the hydraulic pressure is uniformly distributed onto the fluid 107.

In some instances, the hydraulic pressure can be provided by a separate hydraulic pump and the pressure transferred to the fluid 107 via hydraulic equipment (not shown). For example, a low pressure hydraulic pump can be used to produce the pressure and the generated pressure can be increased using pressure booster equipment (not shown).

In some implementations, in the hydrostatic radial forward extrusion, an initial billet with a diameter smaller than the final pipe can be used to produce a final pipe with a diameter larger than the initial billet. Therefore, the volume of the material at the deformation zone can be decreased and the required extrusion force can be reduced compared to the prior methods. By using hydrostatic process, friction force can be eliminated and the extrusion force can be decreased. Furthermore, a movable punch can be used to further reduce the required force. The movable punch can move simultaneously with the initial hollow billet during the hydrostatic radial forward extrusion process and application of extra forces to the process can be eliminated. In addition, simultaneous use of the movable punch inside the initial billet and use of hydraulic fluid can increase the effective area and consequently a significant reduction in the required fluid pressure can be achieved. In various implementations, an increase in the rate of the required force for the hydrostatic radial forward extrusion process can be prevented when the rate of effective area rises. In such implementations, the required hydrostatic pressure can be constant or reduced when the pipe diameter increases.

FIG. 2 illustrates geometrical parameters for the hydrostatic radial forward extrusion system, according to an implementation. As shown in FIG. 1A, the pressure container 109 can be filled with fluid (e.g., hydraulic fluid) 107. An input punch 105 can transmit the force of press 119 into the pressure container 109. In addition, seal pads 111, and 113 can be used for sealing the pressure container 109. For example, a small piece of tungsten carbide (WC) 111 with a precise dimension and close tolerances with a piece of polytetrafluoroethylene (PTFE) 113 with a slightly larger diameter than WC 111 can be used as the seal material. The hydrostatic pressure in the pressure container 109 increased by applying force to the input punch 105 by a hydraulic press 119. For example, the hydrostatic radial forward extrusion process can be conducted at a ram speed of about 5 mm/min (millimeters per minute) at room temperature (e.g., a typical ambient manufacturing air temperature).

The use of a movable punch 115 can increase the total cross section of the hollow billet 101 where the force from hydraulic press 119 is applied. According to the pressure formula (1):

$$P = \frac{F}{A} \quad (1)$$

The pressure P required for a process (e.g. the hydrostatic radial forward extrusion) equals the amount of force F applied perpendicular to the surface A of an object per unit area over which that force is distributed. A decrease in force F and/or increase in surface A, the cross section of hollow billet 101 of FIGS. 1A-1C, can reduce the amount of pressure P required for the hydrostatic radial forward extrusion process. The use of a hollow billet 101 and use of a pressure container 109 filled with fluid 107 can reduce the force F required for the hydrostatic radial forward extrusion process of FIGS. 1A-1C. In addition, using the movable punch 115 increases the cross section A on which the force F is applied. As a result the amount of pressure P required for the hydrostatic radial forward extrusion process can be significantly reduced.

In some exemplary implementations, the amount of force (F) and pressure (P) in a process for forming an Aluminum seamless pipe with a length of 50 centimeters (cm), the external diameter of 36 cm and an internal diameter 34 cm is calculated. When a solid cylindrical billet with a 25 cm diameter is used, a non-hydrostatic radial forward extrusion process for forming the seamless pipe, without a movable punch would require a force of 33,000 kilonewtons. When a hydrostatic radial forward extrusion process is used, with the solid cylindrical billet with 25 cm diameter, without a movable punch, the required force for forming seamless pipe will be 24,300 kilonewtons, and according to formula (1) the pressure (P) will be 4,560 Bars. When a hydrostatic radial forward extrusion process is used, with a fixed punch (not a movable punch), with a hollow billet having a 4 cm thickness, the required force for the forming of seamless pipe will be 5,600 kilonewtons and the pressure (P) 2,150 Bar. And finally, when a hydrostatic radial forward extrusion process is used, with a movable punch 115, and with a hollow billet 101 with a 4 cm thickness, the required force for forming of seamless pipe 123 will be 5,600 kilonewtons and the pressure (P) will be 1100 Bars. Therefore, as shown, the hydrostatic radial forward extrusion method for forming a seamless pipe, with a hollow billet and a movable punch provides a desirably low pressure requirement.

The use of a movable punch 115 also provides a desirably low required pressure P which increases with a rate lower than the increase in size (diameter) of the hollow billet 101. This is because the cross section A would increase exponentially based on the increase in hollow billet 101 diameter while the increase in force F is linear. For example, if the radius $R_2$ of the hollow billet (shown as 201 in FIG. 2) doubles, the cross section A would quadruple ($A=\pi R_2^2$), while the increase in force F would increase based on the weight of the hollow billet 101 and the friction within the pressure container 109 between the hollow billet 101 and the fluid 107. In some instances, the pressure P can decrease with increase of the size of the hollow billet 101.

In some exemplary implementations, using a movable punch 115 for forming a seamless pipe 123 with a 32 millimeters diameter can decrease the required pressure by 0.58 compared to using a fix punch (not shown) instead of the movable punch 115. In addition, in the instant system and method, the required pressure does not increase, and may even decrease, when the diameter of the pipe increases. For example, the required pressure for forming a 32 millimeters diameter pipe, can be 1870 Bars, while the required pressure for forming a 320 millimeters diameter pipe, can be 1795 Bars.

Figure 3:
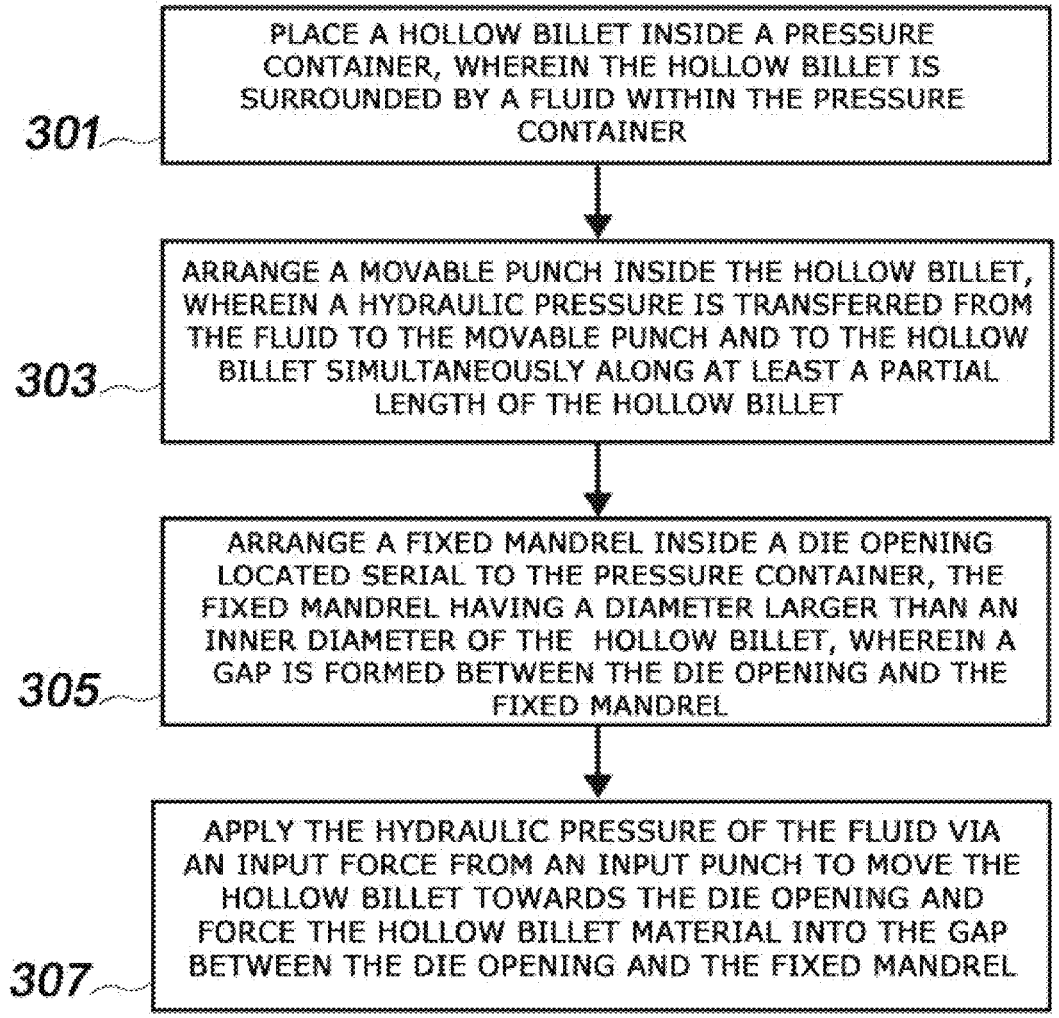
FIG. 3 illustrates a flowchart of a process for hydrostatic extrusion for formation of high strength seamless pipes with large diameters, according to an implementation.

FIG. 3 illustrates a flowchart of a process for hydrostatic extrusion for formation of so-called high strength seamless pipes with large diameters according to an implementation. The details of FIG. 3 are described herein with reference to FIGS. 1A-1C. At step 301, a hollow billet 101 is placed inside a pressure container 109. The pressure container 109 includes fluid 107 such that the hollow billet 101 is surrounded by the fluid within the pressure container 109. The fluid 107 is a hydrostatic fluid which can reduce friction between the hollow billet 101 and the pressure container 109. At step 303, a movable punch 115 is arranged inside the hollow billet 101, such that a hydraulic pressure applied by a press 119 and transferred to fluid 107 by an input punch 105, is transferred from the fluid 107 to the movable punch 115 and to the hollow billet 101, simultaneously, along at least a partial length of the hollow billet 101.

At step 305, a fixed mandrel 117 is arranged inside a die opening 129 located serial to the pressure container 109. Upon placing the fixed mandrel 117 inside the die opening 129, a gap 121 is formed between the die opening 129 and the fixed mandrel 117. The fixed mandrel 117 has a diameter larger than an inner diameter of the hollow billet 101.

At step 307, a rain pressure is applied by a press 119. The pressure is transferred to the pressure container 109 via the input punch 105. The hydrostatic pressure created in the fluid 107 via the input force from then input punch 105 can move the hollow billet 101 towards the die opening 129 and force the hollow billet 101 material into the gap 121 between the die opening 129 and the fixed mandrel 117.

In some implementations, the press 119 and the input punch 105 can be replaced by a pump (e.g., a hydraulic pump, not shown). In such implementations, the hydraulic pressure to the fluid 107 can be generated by an input force from the pump to move the hollow billet 101 towards the die opening 129 and force the hollow billet 101 material into the gap 121 between the die opening 129 and the fixed mandrel 117.

The gap 121 between the die opening 129 and the fixed mandrel 117 may include a radial gap 121a and a forward (e.g. vertical in FIGS. 1A-1C) gap 121b. The hollow billet 101 material can be forced into the gap 121 and receive a radial forward extrusion by first, extruding radially in the radial gap 121a and then extruding forward in the forward gap 121b to form a seamless pipe 123. The inner diameter of the seamless pipe 123 is equivalent to a diameter of the fixed mandrel 117, and a thickness of the seamless pipe 123 is equivalent to a thickness of the gap 121.

The movable punch 115 fits inside the hollow billet 101 and moves together with the hollow billet 101 towards the die opening 129 due to the hydraulic pressure. The fixed mandrel 117 may include a hollow chamber 131 to receive the movable punch 115. The movable punch 115 may have a T shape cross section, such that a top part 133 of the movable punch 115 has a diameter equivalent to an outer diameter of the hollow billet 101 and a bottom part 135 of the movable punch 115 has a diameter equal to a diameter of the hollow billet 101. The diameter of the bottom part 135 of the movable punch 115 can be smaller than the diameter of the hollow chamber 131 inside the fixed mandrel 117. Alternatively, the movable punch 115 may have a cylindrical shape (without a T shaped top) having a diameter equivalent to an inner diameter of the hollow billet and fitting inside the hollow billet according to the close tolerance machining, as previously discussed with regards to FIGS. 1A-1C.

In some implementations, a seal pad (combined from seal pads 111 and 113) can be placed between the input punch 105 and the pressure container 109. The seal pad can prevent leakage of the fluid 107 from the pressure container 109. The seal pad may include a first part 111 and a second part seal pad 113 of sealing material. The first part seal pad 111 is located between the input punch 105 and the second part seal pad 113, and the second part seal pad 113 is located between the first part seal pad 111 and the pressure container 109. The second part seal pad 113 may have a diameter larger than the first part seal pad 111 for sealing purposes. In some instances, the sealing material of the first part seal pad 111 can be tungsten carbide and the sealing material of the second part seal pad 113 can be polytetrafluoroethylene (PTFE).

Figure 4:
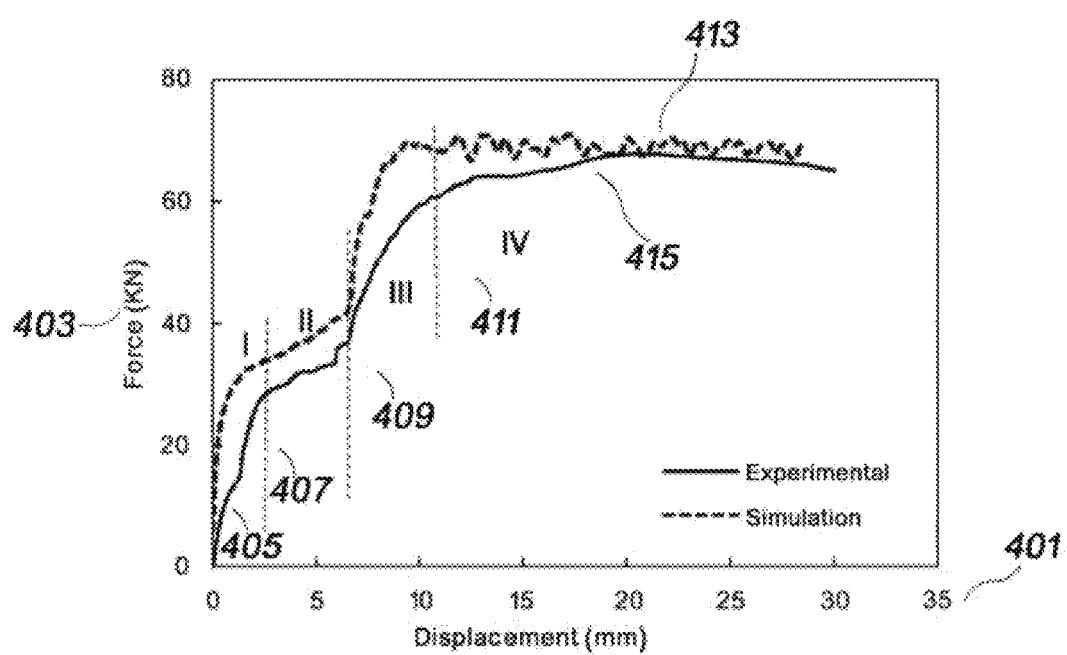
FIG. 4 illustrates an experimental and simulated force versus ram displacement during the hydrostatic extrusion process, according to an implementation.

FIG. 4 illustrates a comparison between experimental and simulated force calculation versus ram displacement during the hydrostatic radial forward extrusion process, according to an implementation. In FIG. 4, axis 401 represents ram displacement (in millimeters) during the hydrostatic radial forward extrusion process, as disclosed in FIGS. 1A-1C. The axis 403 shows the amount of force applied during the hydrostatic radial forward extrusion process in kilonewtons.

As shown in FIG. 4, the experimental and simulated force curves 413 and 415 of hydrostatic radial forward extrusion process can be divided into four zones 405, 407, 409 and 411. In the first zone 405, the force 403 increases until the pipe material (material of the hollow billet 101) reaches a flow stress, which is defined as the instantaneous value of stress required to continue plastically deforming the material, to keep the metal flowing. Within the second zone 407, the pipe material enters the radial gap 121a of FIG. 1B with an increase in the force level. In zone 407, the slope of the curves 413 and 415 are changing. The third zone 409 starts at the start region of the corner within gap 121 between the radial part 121a and the forward gap 121b. In zone 409, the force curves 413 and 415 sharply increase so that the pipe material can fill the corner gap.

The slope of the curves in zone 409 is larger than that of the previous zone 407. When, the corner gap is filled, the last zone 411 starts at the pick load. The highest force 413 and 415 occurs at the end of the radial gap 121a and at entry point of the forward gap 121b. As represented by the experimental curve 413 and simulated curve 415, the two curves follow a similar pattern and there is agreement between the two curves. In one exemplary calculation, the maximum force (F in equation 1) of experimental (413) and simulated (415) curves are respectively about 67.9 kilonewtons and 71.1 kilonewtons. The hydrostatic pressures (P) associated with these loads are respectively about 1787 Bars and 1871 Bars. The highest difference between the two curves is 4.4%.

Figure 5A:
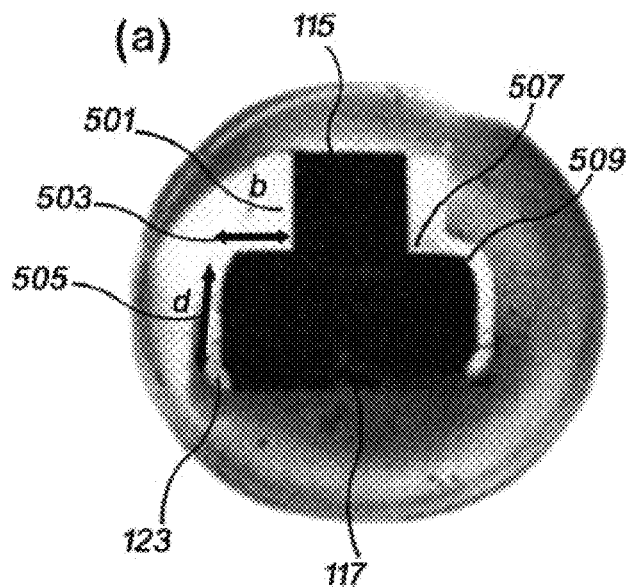
FIGS. 5A-5D illustrate a cross section and material flow microstructure of a seamless pipe formed by the hydrostatic radial forward extrusion, according to an implementation.

FIGS. 5A-5D illustrate a cross section and material flow microstructure of a seamless pipe formed by the hydrostatic radial forward extrusion, according to one implementation. FIG. 5A illustrates a cross section of a processed seamless pipe 123 along the pipe axis 127 with the fixed mandrel 117 and the movable punch 115, as shown in FIG. 1A.

The micro-hardness of the formed seamless pipe 123 can be measured at the annular gap 121 at both cross sections of parallel and perpendicular to the pipe axis 127 with a load of 100 g-force, applied for 10 seconds. Tensile properties of the unprocessed hollow billet 101 and the produced seamless pipe 123 can be investigated using the tensile test at room temperature at a strain rate of $10^{-4}$. In an exemplary implementation, gauge length, gauge width, gauge thickness, radius length of grip section and width of grip section of the tensile test samples were respectively, 15 mm, 5 mm, 2.5 mm, 2.5 mm, 40 mm and 10 mm. To display the material flow pattern during the process, standard metallography and optical microscopy were used.

In some exemplary implementations, numerical techniques such as, for example Finite Element Method (FEM) can be used for simulating deformation behavior of the material of seamless pipe 123 produced by the hydrostatic radial forward extrusion. The geometrical dimensions of components of system 100 and the hollow billet 101 and also mechanical properties of the hollow billet 101 were considered in the simulation of the process to be identical to the performed experiments. In some instances a square mesh element with four nodes and edge length of 0.5 mm can be used to mesh the model. In addition, an automatic re-meshing method can be employed to adapt the imposed large strain and increase the accuracy of the results. Components of the system 100 can be modeled as rigid parts, and the Coulomb friction coefficient can be assumed to be 0.05 between the system 100 component and the hollow billet 101 except between the pressure container 109 and the hollow billet 101. The interaction between the pressure container 109 and the hollow billet 101 can be considered frictionless because the use of the fluid 107.

Figure 5B:
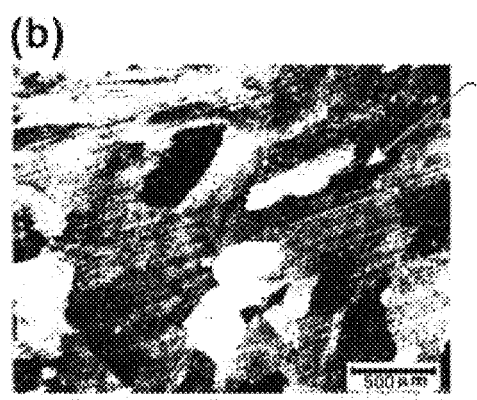
Figure 5C:
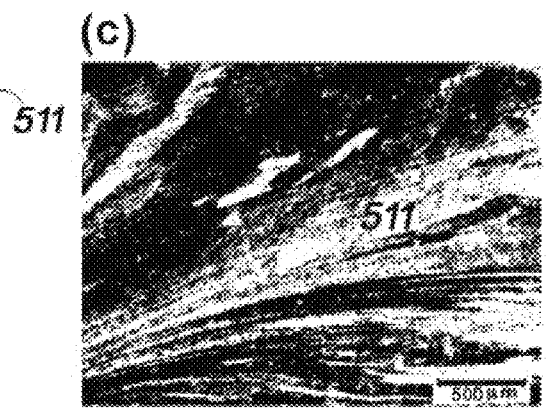
Figure 5D:
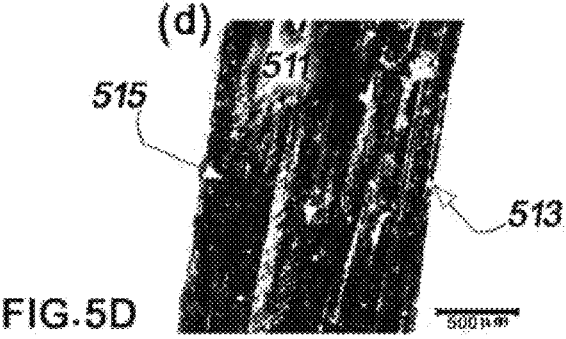

FIGS. 5B, 5C, and 5D illustrate a material flow microstructure of the hollow billet 101 and formed seamless pipe 123 at regions 501, 503, and 505 as shown. As shown in the cross section of FIG. 5A, a hollow thick wall hollow billet 101 (shown at region 501 of FIG. 5A) is deformed to a thinner seamless pipe 123 (shown at zone 505 of FIG. 5A) after extruding through two angular gaps 503 and 505 of FIG. 1B). The material of hollow billet 101 experience high shear deformation in zones 507 and 509 while extruding through gaps 503 and 505 (similar to gaps 121a and 121b of FIG. 1B). The microstructures of the material at regions 501, 503, and 505 are shown respectively in FIGS. 5B, 5C, and 5D.

The microstructure of the region 501 that experiences no shear deformation with only constrained compression is shown in FIG. 5B and is almost identical to the unprocessed recrystallized equiaxed microstructure of the hollow billet 101 with a grain size of about 350 μm. Material flow microstructure during the hydrostatic radial forward extrusion process, in the gap 503 where the entrance of radial gap (region 503) is shown in FIG. 5C that shows stretching of the material structure with elongated grains along the extrusion direction 511. High compressive and shear strains resulted from shear zone 507 is applied to the material in this zone. A large effective strain is applied to the flow material at the entrance of the radial gap 503 (shear zone 507) and entrance to forward gap 505 (shear zone 509) which the majority of this effective strain is in shear mode. The equivalent effective strain is increased with entrance of the flow material into the forward channel as a result of experiencing shear zone 509. Total accumulated equivalent plastic strain in the zone 505 can be calculated as about 2.56.

The accumulated equivalent plastic strain can cause more grain refinement and microstructure stretching as shown in 5D. As shown, due to high compressive stress, with the stretching rate in regions close to fixed mandrel 117 (inner wall 513) being more than other regions (e.g., outer wall 515). At the shear zone 509, the material is extruded 90° annular gap and the seamless pipe 123 is formed around fixed mandrel 117. The shear strain causes stretching of the grain size of the material with increased dislocation in the microstructure. As shown in FIGS. 5A-5D, the hydrostatic radial forward extrusion process causes significant grain refinement and grain elongation. The hydrostatic radial forward extrusion process is a combined extrusion in which sequential radial and forward extrusion are performed. Also, producing large seamless pipes from smaller hollow billet 101, using the hydrostatic radial forward extrusion process described, causes implementation of a large effective strain in the processed seamless pipe 123. The strain causes significant grain refinement and improvement in the strength of the produced seamless pipe 123 as a high strength seamless pipe.

Figure 6A:
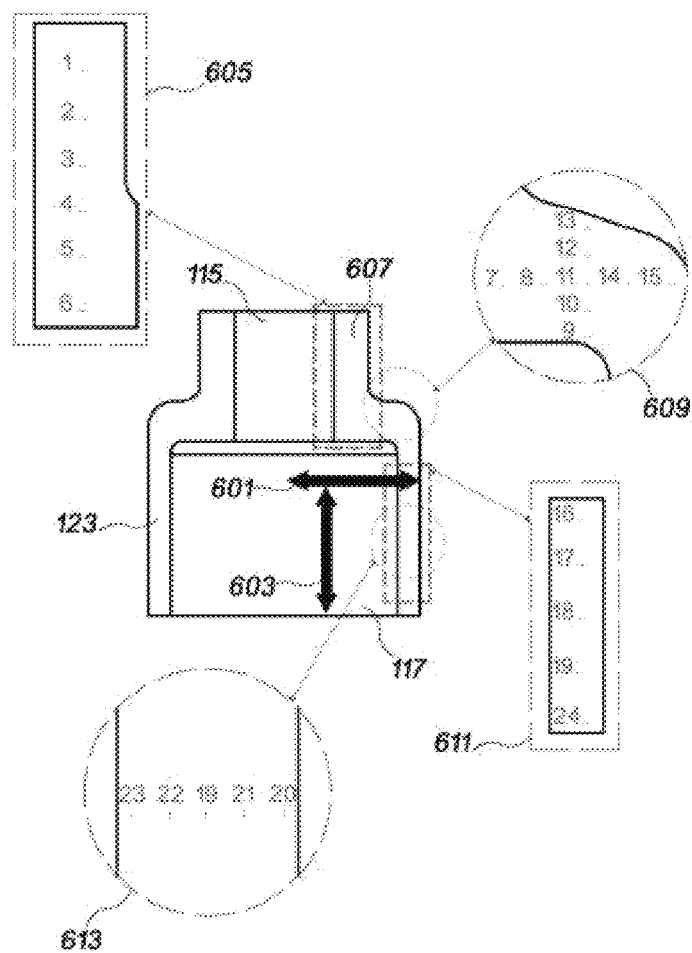
FIG. 6A-6B illustrate positions where the micro-hardness of the pipe material is measured, according to one implementation.
Figure 6B:
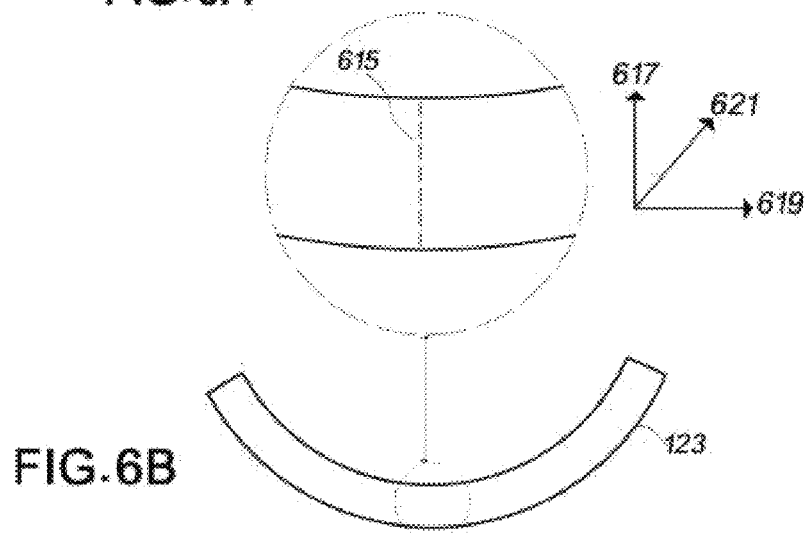

FIG. 6A-6B illustrate positions where the micro-hardness of the pipe material is measured, according to one implementation. FIG. 6A shows a cross section of system 100 of FIG. 1A along the pipe axis 127 and FIG. 6B shows a cross section perpendicular to pipe axis 127. Micro-hardness changes can be studied at different locations of the hollow billet 101 (e.g., an Aluminum, Magnesium, Copper, Zinc, etc., workpiece) during hydrostatic radial forward extrusion process as shown in FIGS. 6A-6B. In one example, the micro-hardness of the initial unprocessed hollow billet 101 was measured using a Vickers hardness test at about 28 Vickers Pyramid Number (HV). FIG. 6A displays the points of the sample cross section where the micro-hardness was measured.

Micro-hardness of material in gap 607 (similar to 501 of FIG. 5) prior to the material entering the radial gap 503, is negligible because at this stage almost no microstructural changes have occurred. However, in gap 607 and close to fixed mandrel 117 (shown as point 6 in area 605), due to high compressive and contact strains where the material starts to flow into the radial gap 601, the micro-hardness may slightly increase. The micro-hardness in the radial gap 601 compared to the gap 607 (in points 7-14 points in area 609) increases because the plastic strain is applied to the material, where grain refinement and work hardening occurs. The average micro-hardness value for points 9-13 in area 609, is approximately 52.4 HV.

Figure 7A:
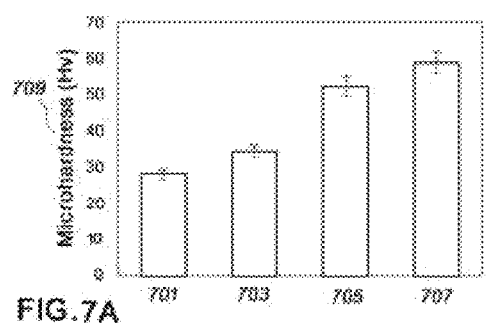
FIGS. 7A-7D illustrate graphs of variations in micro-hardness of pipe material at different stages of the hydrostatic radial forward extrusion, according to one implementation.
Figure 7B:
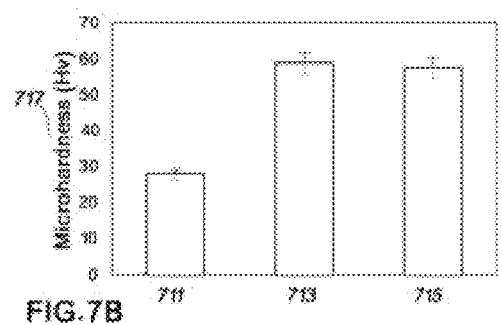

FIGS. 7A-7D illustrate graphs of variations in micro-hardness of pipe material at different stages of the hydrostatic radial forward extrusion, according to one implementation. In the graph of FIG. 7A, the axis 709 represents micro-hardness of pipe material in HV scale. The bar 701 shows the micro-hardness of the pipe material (e.g., Aluminum, Magnesium, Copper, Zinc, Plastic, etc.) in the hollow billet 101 (shown in FIGS. 1A-1C) prior to performing hydrostatic radial forward extrusion process. The bar 703 shows the microhardness of the pipe material during the hydrostatic radial forward extrusion process, when the billet 101 is in region 501 (shown in FIG. 5A0, during the hydrostatic radial forward extrusion process, prior to the pipe material entering the radial gap 503. The bar 705 shows the microhardness of the pipe material (shown in FIGS. 1A-1C) within the radial gap 503, during the hydrostatic radial forward extrusion process. The bar 707 shows the microhardness of the pipe material within the forward gap 505, during the hydrostatic radial forward extrusion process. As shown by bar graphs 701,703, 705, and 707 the micro-hardness of the material in billet 101 increases during the hydrostatic radial forward extrusion process and as a result, the produced seamless pipe 123 has a higher level of microhardness compared to the hollow billet 101. The micro-hardness of the produced seamless pipe 123 is equivalent of the micro-hardness 707 in the forward gap 505.

As previously discussed, in one exemplary implementation, the average microhardness value in the radial gap 503 is approximately 52.4 HV and in the forward gap 505, the average microhardness is approximately 57.64 HV. This shows an enhancement factor of about 2.06 HV in the microhardness compared to that of the initial hollow billet 101. The value of 2.06 is higher than that obtained in typical pipe forming techniques known as severe plastic deformation (SPD) processes such as, for example, tubular channel angular pressing (TCAP) or tube channel pressing TCP processes. The enhancement values of about 1.53 after three passes of TCAP and about 1.7 after five passes of TCP have been reported.

Figure 7C:
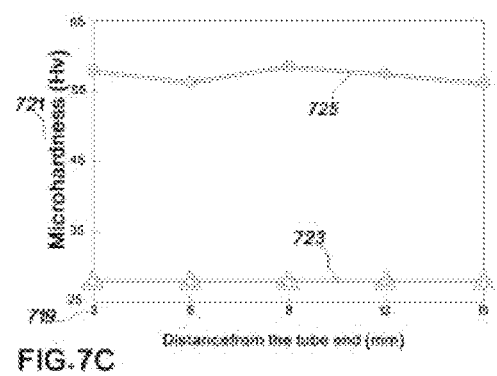

FIG. 7C shows a diagram of micro-hardness variation across the length of the produced seamless pipe 123 (points 16-19 and 24 in area 611 of FIG. 6A). In the diagram of FIG. 7C, an axis 719 represents a distance from the end of the produced seamless pipe 123 (in millimeters) and axis 721 represents micro-hardness in HV. A curve 723 represents micro-hardness of the initial hollow billet 101 which is a horizontal line showing that micro-hardness is the same across the length hollow billet 101. A curve 725 represents micro-hardness of the produced seamless pipe 123 measured in points 16-19 and 24 in area 611 of FIG. 6A parallel to the length of produced seamless pipe 123 (shown as axis 617 in FIG. 6B). The curve 725 shows small variations in micro-hardness along the length of the produced seamless pipe 123. In addition, the microhardness along the length of the produced seamless pipe 123 represents homogeneous properties along the pipe.

Figure 7D:
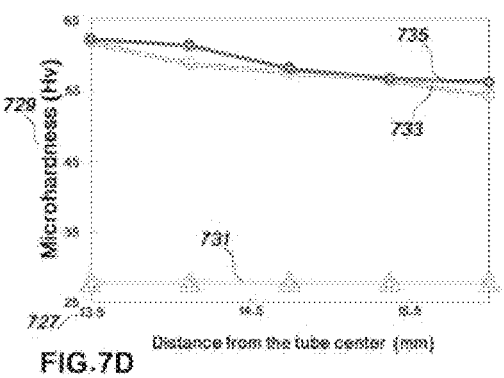

FIG. 7D shows a diagram of micro-hardness variation across the width of the produced seamless pipe 123 (points 19-23 in area 613 of FIG. 6A). The micro-hardness of the produced seamless pipe 123 along the width of the seamless pipe 123 changes in the direction of axis 619 in FIG. 6B (points 19-23 in area 613 of FIG. 6A) and perpendicular to axis 619 in a direction of axis 621 on points along line 615 in FIG. 6B). In the diagram of FIG. 7D, an axis 727 represents a distance from the center of the seamless pipe 123 (in millimeters) and axis 729 represents micro-hardness in HV. A curve 731 represents micro-hardness of the initial hollow billet 101 which is a horizontal line showing that micro-hardness is the same across the width hollow billet 101.

A curve 733 represents micro-hardness of the produced seamless pipe 123 measured in points parallel to the axis 619 of FIG. 6B. The curve 733 shows small variations in micro-hardness along the width of the produced seamless pipe 123. In addition, a curve 735 represents micro-hardness of the produced seamless pipe 123 measured in points parallel to the axis 621 of FIG. 6B. The curve 733 shows small variations in micro-hardness along the thickness of the produced seamless pipe 123. As shown, the micro-hardness of the produced seamless pipe 123 along the width and the thickness is increased compared to the micro-hardness of the hollow billet 101. As shown in FIG. 7D, when the distance from the center of pipe (axis 727) increases, the micro-hardness from the inner to the outer wall of produced seamless pipe 123 may slightly decrease, because of microstructural variations.

Figure 8:
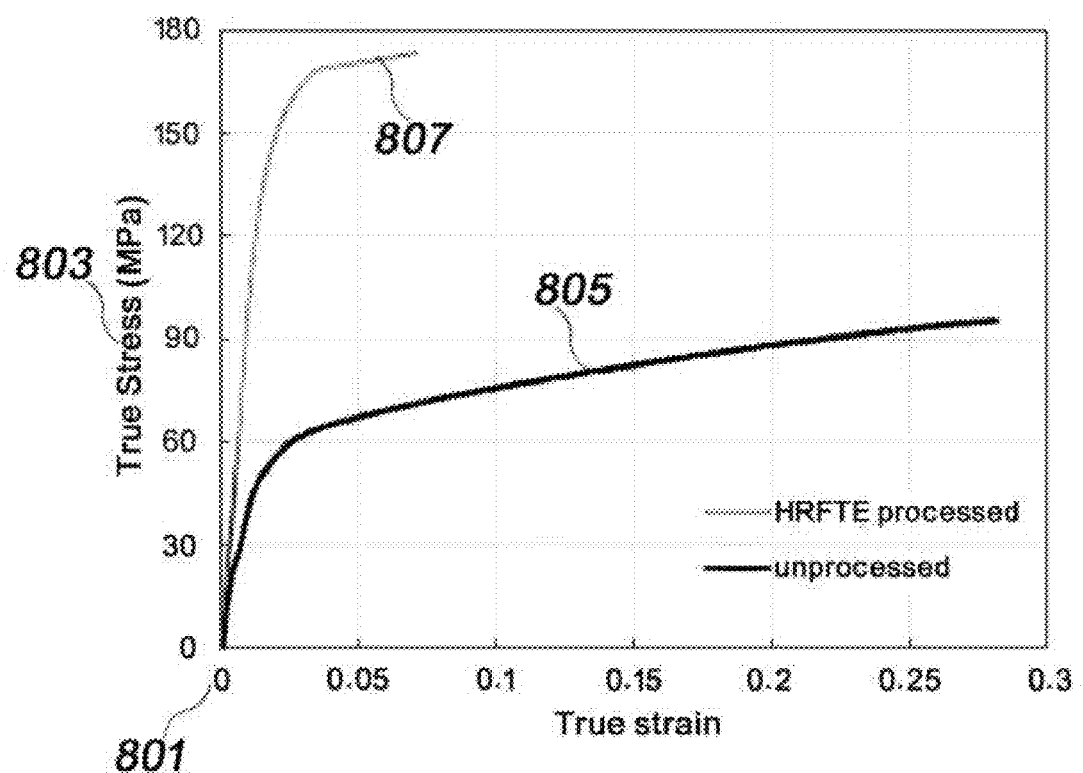
FIG. 8 illustrates true stress-strain curves of the hollow billet and the final formed tube, according to an implementation.

FIG. 8 illustrates true stress-strain curves of the hollow billet and the final formed tube, according to an implementation. The stress-strain curve is a unique curve for each material and represents the relationship between the stress (a physical quantity that expresses the internal forces that neighboring particles of a continuous material exert on each other), and strain (the measure of the deformation of the material) that the material displays. In the diagram of FIG. 8, an axis 801 represents a true strain of material in the hollow billet 101 or in the produced seamless pipe 123. An axis 803 represents true stress of the material in the hollow billet 101 or in the produced seamless pipe 123. A curve 805 represents the relation between the true stress and true strain for the hollow billet 101 prior to being processed using the hydrostatic radial forward extrusion. A curve 807 represents the relation between the true stress and true strain for the produced seamless pipe 123 formed using the hydrostatic radial forward extrusion.

In some implementations, the hydrostatic radial forward extrusion process can increase a yield strength (YS) and ultimate tensile strength (UTS) of the produced seamless pipe 123 to 154 Megapascal (MPa) and 176 Mpa, respectively from 62 Mpa and 96 Mpa. Rising in the yield strength and ultimate strength is due to grain refinement as a result of severe deformation applied in the shear zone 507 (entrance of the radial gap 503) and shear zone 509 (entrance of forward gap 505) of FIG. 5. In addition, the yield strength and ultimate strength increase due to high hydrostatic compressive stresses.

In the instant system and method the hydrostatic radial forward extrusion, due to required low pressure, the extrusion can be performed at room temperature (cold extrusion) without a need for heating the hollow billet to an elevated temperature. As a result, the hydrostatic radial forward extrusion process can be applied to wide variety of hollow billet material such as non-heat treatable material. Alternatively, the instant system and method can be performed at elevated temperatures to further reduce the required pressure.

Figure 9:
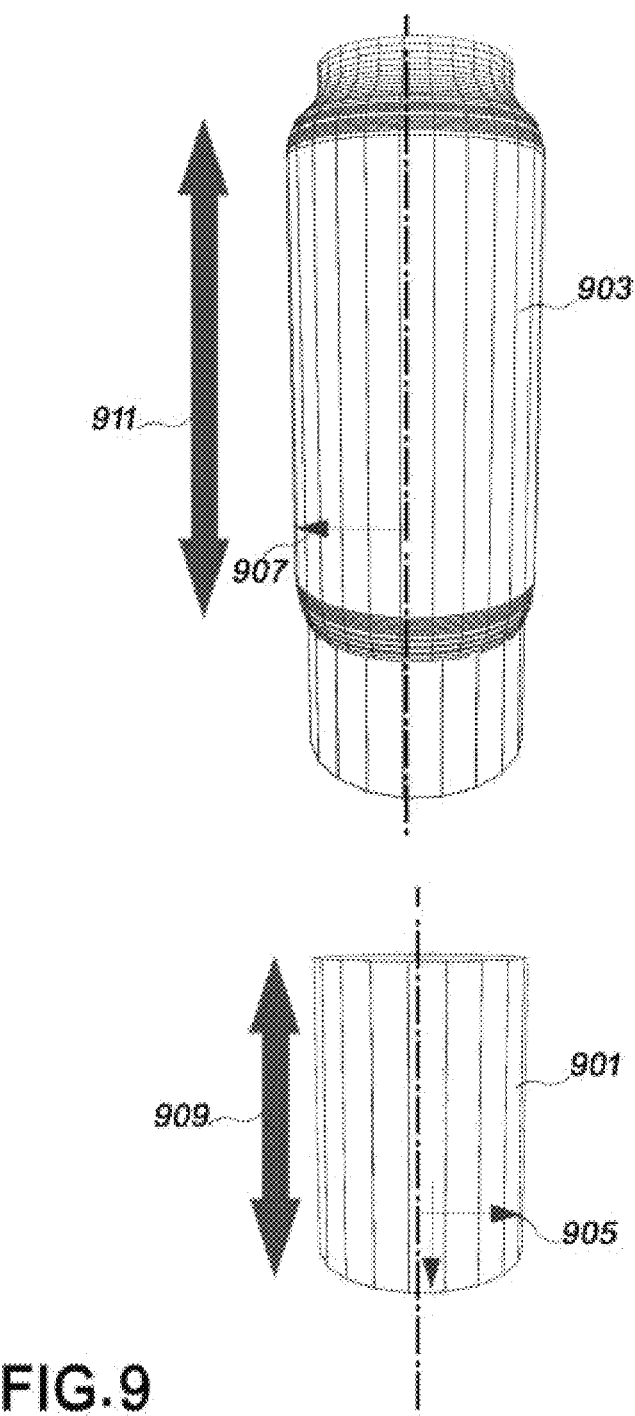
FIG. 9 illustrates a hollow billet and a final formed seamless pipe, according to an implementation.

FIG. 9 illustrates a hollow billet and a final formed seamless pipe, according to an implementation. As shown in FIG. 9, a thick-walled hollow billet 901 (similar to hollow billet 101 of FIGS. 1A-1C) with a smaller diameter 905 is formed, using the hydrostatic radial forward extrusion process, into a seamless pipe 903 (similar to seamless pipe 123 of FIGS. 1A-1C) where pipe 903 has a thinner wall and a larger diameter 907 compared with the hollow billet 901. In addition, the length 911 of the formed pipe 903 is longer than the length 909 of the hollow billet 901, because the thickness is reduced. As shown in FIG. 9, the formed pipe 903 has a smooth surface.

Figure 10:
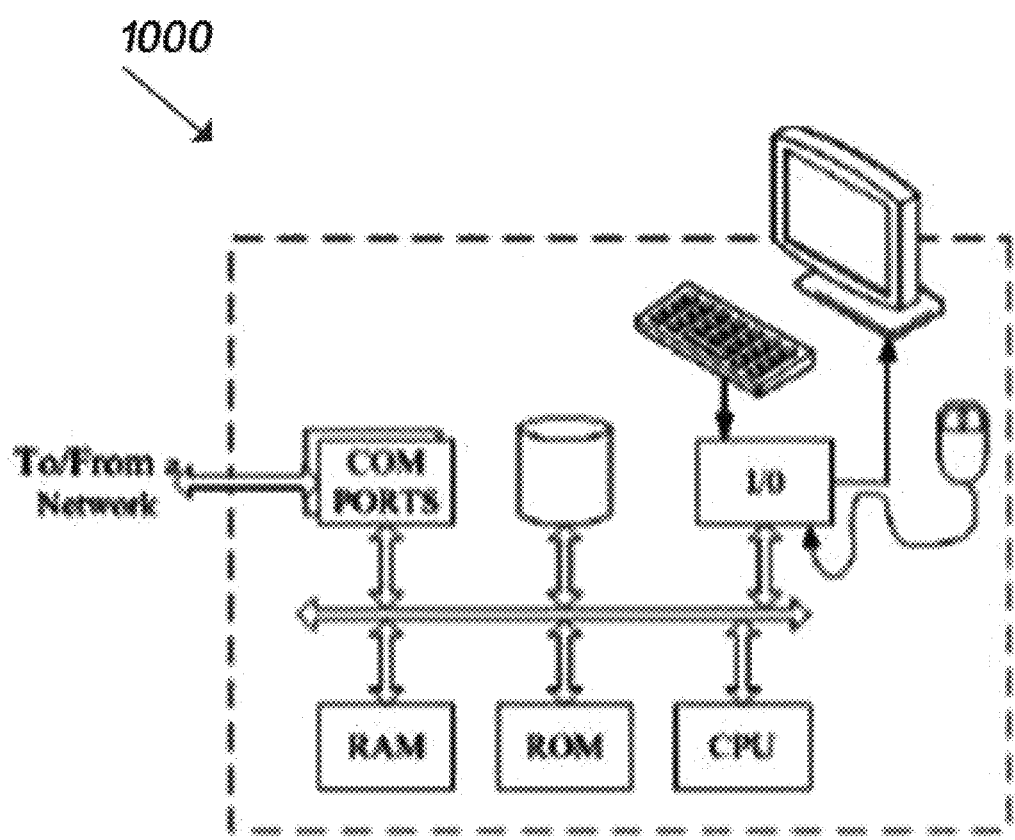
FIG. 10 is a simplified functional block diagram of an exemplary personal computer or customer device that may be used for simulation of the hydrostatic radial forward extrusion process.

FIG. 10 is a simplified functional block diagram of an exemplary personal computer or customer device that may be used for simulation of the hydrostatic radial forward extrusion process. FIG. 10 depicts a computing device 1000 with user interface elements, as may be used to implement a personal computer or other type of work station or terminal device. The structure, programming and general operation of such computer equipment are well known and as a result, the drawings should be self-explanatory.

A computing device, for example, includes a data communication interface for packet data communication. The computing device also includes a central processing unit (CPU), in the form of one or more processors, for executing program instructions. The computing device platform typically includes an internal communication bus, program storage and data storage for various data files to be processed and/or communicated by the computing device, although the computing device often receives programming and data via network communications. The hardware elements, operating systems, and programming languages of such computing devices are conventional in nature. Of course, the computing device functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 10). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems, and programming languages of such user terminal devices also are conventional in nature.

Hence, aspects of the methods of providing simulation of a hydrostatic radial forward extrusion system and process outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement a simulation of the hydrostatic radial forward extrusion process, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The separation of various components in the examples described above should not be understood as requiring such separation in all examples, and it should be understood that the described components and systems can generally be integrated together in a single package, or into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A system for producing a seamless pipe from a hollow billet, comprising:
   a pressure container configured to house the hollow billet, wherein the hollow billet is surrounded by a fluid in the pressure container;
   a movable punch arranged to fit inside the hollow billet, wherein a hydraulic pressure is transferred from the fluid to the movable punch and to the hollow billet, simultaneously, along at least a partial length of the hollow billet;
   a fixed mandrel having a diameter larger than an inner diameter of the hollow billet;
   a die opening arranged serial to the pressure container, wherein the die opening is configured to house the fixed mandrel, and wherein a gap is formed between the die opening and the fixed mandrel; and
   an input punch, wherein the hydraulic pressure to the fluid is generated by an input force from the input punch to move the hollow billet towards the die opening and force the hollow billet material into the gap between the die opening and the fixed mandrel.

2. The system of claim 1, wherein the gap between the die opening and the fixed mandrel includes a radial gap and a forward gap, and wherein the hollow billet is forced into the gap to receive a radial forward extrusion by first extruding radially in the radial gap and then extruding forward in the forward gap to form a pipe, wherein an inner diameter of the pipe is equivalent of a diameter of the fixed mandrel and a thickness of the pipe is equivalent of a thickness of the gap.

3. The system of claim 2, wherein one or more microstructural changes during the radial forward extrusion cause a micro-hardness of material in the pipe to be higher than a micro-hardness of a material of the hollow billet.

4. The system of claim 2, wherein the radial forward extrusion is performed without addition of heat by heating equipment.

5. The system of claim 2, wherein the radial forward extrusion is performed with addition of heat by heating equipment.

6. The system of claim 1, wherein the hollow billet material forced into the gap between the die opening and the fixed mandrel forms the seamless pipe having high strength.

7. The system of claim 1, wherein the movable punch fits inside the hollow billet and moves together with the hollow billet towards the die opening due to the hydraulic pressure, and wherein the fixed mandrel includes a hollow chamber to receive the movable punch.

8. The system of claim 7, wherein the movable punch has a T-shape cross section, such that a top part of the movable punch has a diameter equivalent to an outer diameter of the hollow billet, and a bottom part of the movable punch has a diameter equal to an inner diameter of the hollow billet.

9. The system of claim 7, wherein the movable punch has a cylindrical shape having a diameter equivalent to an inner diameter of the hollow billet.

10. The system of claim 1, further comprising:
    a seal pad provided between the input punch and the pressure container configured to prevent leakage of the fluid from the pressure container.

11. The system of claim 10, wherein the seal pad includes a first part of sealing material and a second part of sealing material, and wherein the first part is located between the input punch and the second part, and the second part is located between the first part and the pressure container, and wherein the second part has a diameter larger than the first part.

12. The system of claim 1, wherein the hollow billet is a non-ferrous billet.

13. A method for producing a seamless pipe from a hollow billet, the method comprising:
    placing the hollow billet inside a pressure container, wherein the hollow billet is surrounded by a fluid within the pressure container;
    arranging a movable punch inside the hollow billet, wherein a hydraulic pressure is transferred from the fluid to the movable punch and to the hollow billet simultaneously, along at least a partial length of the hollow billet;
    arranging a fixed mandrel inside a die opening located serial to the pressure container, the fixed mandrel having a diameter larger than an inner diameter of the hollow billet, wherein a gap is formed between the die opening and the fixed mandrel; and applying the hydraulic pressure to the fluid via an input force from an input punch to move the hollow billet towards the die opening and force the hollow billet material into the gap between the die opening and the fixed mandrel.

14. The method of claim 13, wherein the gap between the die opening and the fixed mandrel includes a radial gap and a forward gap, and wherein the hollow billet material forced into the gap receives a radial forward extrusion by first extruding radially in the radial gap and then extruding forward in the forward gap to form a pipe, wherein an inner diameter of the pipe is equivalent of a diameter of the fixed mandrel and a thickness of the pipe is equivalent of a thickness of the gap.

15. The method of claim 14, wherein the pressure container, the hollow billet, the movable punch and the fixed mandrel are enclosed within an outer die and wherein the outer die is set up i) horizontally or ii) vertically.

16. The method of claim 13, wherein the movable punch fits inside the hollow billet and moves together with the hollow billet towards the die opening due to the hydraulic pressure, and wherein the fixed mandrel includes a hollow chamber to receive the movable punch.

17. The method of claim 16, wherein the movable punch has a T shape cross section, such that a top part of the movable punch has a diameter equivalent to an outer diameter of the hollow billet, and a bottom part of the movable punch has a diameter equal to or smaller than an inner diameter of the hollow chamber inside the fixed mandrel.

18. The method of claim 16, wherein the movable punch has a cylindrical shape having a diameter equivalent to an inner diameter of the hollow billet.

19. A system for producing a seamless pipe from a hollow billet, comprising:
  a pressure container configured to house the hollow billet, wherein the hollow billet is surrounded by a fluid in the pressure container;
  a movable punch arranged to fit inside the hollow billet, wherein a hydraulic pressure is transferred from the fluid to the movable punch and to the hollow billet simultaneously, along at least a partial length of the hollow billet;
  a fixed mandrel having a diameter larger than an inner diameter of the hollow billet; and
  a die opening arranged serial to the pressure container, wherein the die opening is configured to house the fixed mandrel, and wherein a gap is formed between the die opening and the fixed mandrel,
  wherein the hydraulic pressure to the fluid is generated by an input force from a pump to move the hollow billet towards the die opening and force the hollow billet material into the gap between the die opening and the fixed mandrel.

20. The system of claim 19, wherein the hollow billet material forced into the gap between the die opening and the fixed mandrel forms the seamless pipe having high strength.

* * * * *